United States Patent Office 3,265,731
Patented August 9, 1966

3,265,731
N-NITRO-N-(SUBSTITUTED BENZYL) ALKANESULFONAMIDES
Peter F. Epstein, El Cerrito, Calif., assignor to Stauffer Chemical Company, New York, N.Y., a corporation of Delaware
No Drawing. Filed Oct. 31, 1963, Ser. No. 320,497
2 Claims. (Cl. 260—556)

This invention relates to certain novel compositions of matter. More specifically, the invention relates to certain N-nitro-N-(substituted benzyl) alkanesulfonamides. The sulfonamides of the present invention have the following general structural formula:

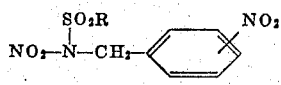

In the above formula R is a member selected from the group consisting of lower alkyl radical groups. The benzene ring may be substituted with substituents such as lower alkyls and halogens.

In general, the composition of this invention may be made by reacting an N-(substituted benzyl) alkanesulfonamide of the type

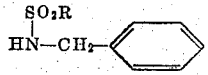

wherein R has the same meaning as given in the above-mentioned formula, with a mixture of sulfuric and nitric acids. The N-(substituted benzyl) alkanesulfonamide which is used will determine the substituents at R. For instance, if R is to be isopropane and the benzene ring is to contain chlorine, N-(monochlorobenzyl) isopropanesulfonamide is used as a suitable starting material.

The compounds of the present invention are unusual in that they contain two nitro-groups, one on the aromatic ring and the other on the sulfonamido nitrogen. Both groups are introduced during the same nitration reaction.

The compositions of the present invention may be used in various manners in the arts. The compound, N-nitro-N-(4-nitrobenzyl) methanesulfonamide, of this invention has been tested and found effective as a systemic fungicide at 50 parts per million (p.p.m.) on rust and controls soil fungi (R. solani) at 110 p.p.m. Further, the compounds of the present invention may also be used as ore flotation agents, lubricating oil additives and in the compounding of rubber.

The following example illustrates the preparation of compounds falling within the scope of the present invention.

Example

To a mixture of nitric acid sp. gravity 1.42 (250 parts) and sulfuric acid sp. gravity 1.84 (125 parts) was added 46.3 parts of N-benzyl methanesulfonamide. The temperature of the acid mixture was between 40–45° C. After the addition was completed the mixture was stirred for 4 hours and then poured into water (1000 parts). The white precipitate was filtered and purified by recrystallization from ethanol. There was formed 53.6 parts (85% yield) of N-nitro-N-(4-nitrobenzyl) methanesulfonamide. The observed melting point was 97–98.5° C.

Analysis.—Calculated for $C_8H_9N_3O_6S$: C, 34.91; H, 3.30; N, 15.27; S, 11.65. Found: C, 35.50; H, 3.29; N, 14.81; S, 10.83.

The identity of the material was affirmed by its infrared spectrum which contained no N—H band. There were observed >$SO_2$ bands at 1165 and 1350 cm.$^{-1}$ and —$NO_2$ bands at 1350 and 1560 cm.$^{-1}$, also unassigned bands at 750, 785, 855, 960, 1020, 1280, and 1520 cm.$^{-1}$.

Various changes and modifications may be made in the compositions described herein as will be apparent to those skilled in the chemical arts. It is accordingly intended that the present invention shall only be limited by the scope of the appended claims.

I claim:
1. As a new composition of matter, a compound having the formula

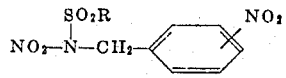

wherein R is a lower alkyl.
2. As a new composition of matter, N-intro-N-(4-nitrobenzyl) methanesulfonamide.

References Cited by the Examiner

Beilstein, vol. 4, pp. 86 and 130, 4th ed. (1922).

WALTER A. MODANCE, Primary Examiner.
HARRY I. MOATZ, Assistant Examiner.